United States Patent [19]

Mukaemachi et al.

[11] 4,113,988
[45] Sep. 12, 1978

[54] SPEECH PATH PACKAGING UNIT INCLUDING CONTROLLER CONTAINING SHIFT REGISTER

[75] Inventors: Takuji Mukaemachi; Tetsuo Takeshita, both of Yokohama; Shiroh Enami, Hiratsuka, all of Japan

[73] Assignee: Hitachi, Ltd., Japan

[21] Appl. No.: 775,619

[22] Filed: Mar. 8, 1977

[30] Foreign Application Priority Data

Mar. 10, 1976 [JP] Japan .................................. 51-25112

[51] Int. Cl.² ............................................. H04Q 3/54
[52] U.S. Cl. ............................................... 179/18 ES
[58] Field of Search .......... 179/18 ES, 18 EA, 18 EB

[56] References Cited

U.S. PATENT DOCUMENTS 3,795,773  3/1974  Konig et al. ............... 179/18 ES
3,963,872  6/1976  Hagstrom et al. .......... 179/18 GF
3,974,343  8/1976  Cheney et al. ............. 179/18 ES Primary Examiner—Thomas W. Brown
Attorney, Agent, or Firm—Craig & Antonelli

[57] ABSTRACT

A speech path apparatus in a space-division type electronic exchanger equipment wherein a plurality of switching networks each having controlled points and a plurality of trunks are divided into an appropriate number of packaging units, and a network controller and a trunk controller are provided for each packaging unit. Each of the network controllers and the trunk controllers includes a shift register for receiving a control signal sent from a central processing unit in serial form, a means for determining whether the received control signal is for its own unit and means for translating a control signal stored in the shift register to send it out in parallel form to the controlled point.

3 Claims, 6 Drawing Figures

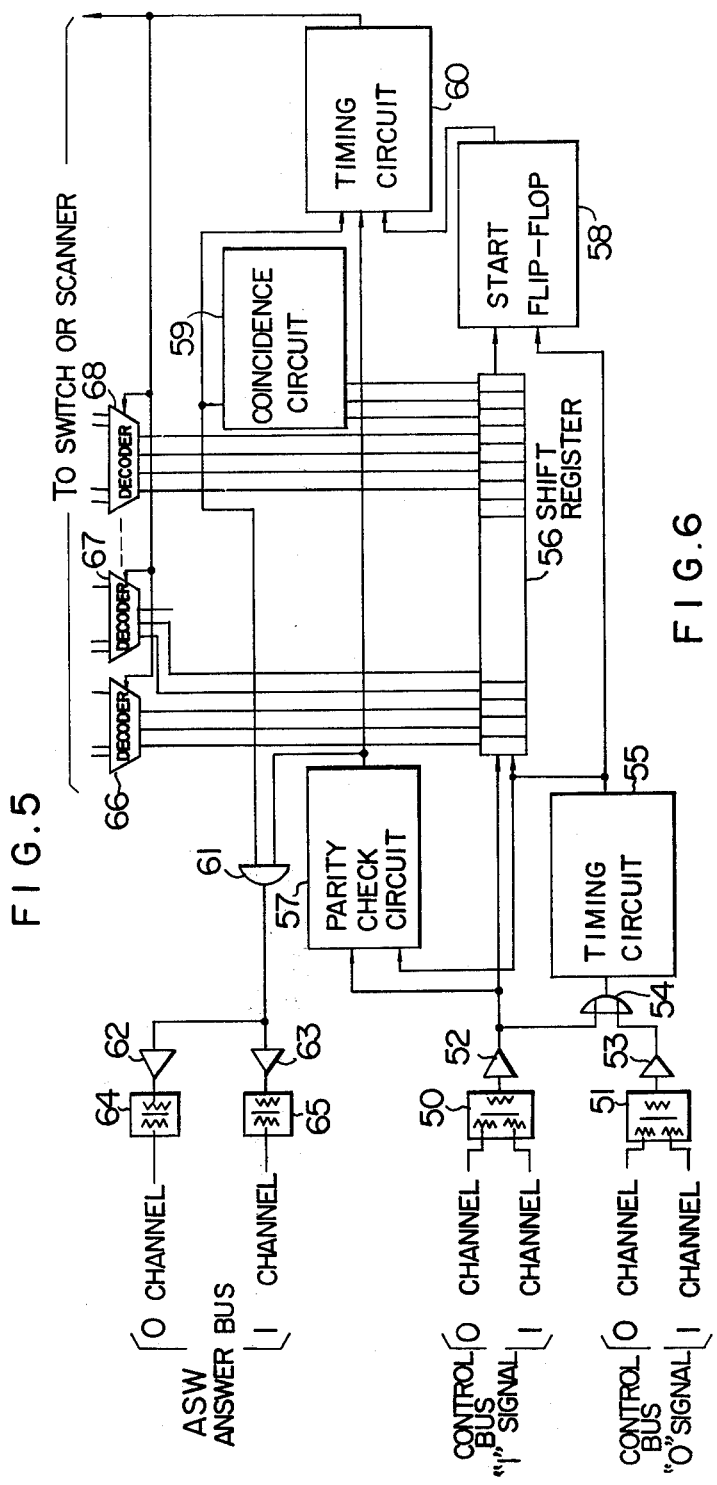

SPEECH PATH PACKAGING UNIT INCLUDING CONTROLLER CONTAINING SHIFT REGISTER

The present invention relates to a speech path apparatus suitable for use in a space-division type electronic exchanger equipment, particularly in a space-division type electronic exchanger equipment using semiconductor speech path switches.

With the remarkable progress in recent semi-conductor manufacturing technology, particularly of integrated circuit technology, approaches have been made to introduce semiconductor speech path switches such as thyristors, PNPN diodes and field effect transistors, as speech path switches for the space-division type electronic exchanges equipment.

Control signals for the space-division type speech path apparatus using such semiconductor speech path switches substantially differ from those for conventional mechanical switches and they are in the form of pulses of very low level and very high speed. This means that the resistance to noise has been reduced and, as a result, the type of control line as well as the length and material thereof are restricted. This imposes restriction on the size of the apparatus and the cost reduction in wiring. The space-division type speech path apparatus generally comprises speech path equipments such as switching networks and trunks, speech path equipment controllers interposed between the speech path equipments and a central processing unit, and scanners. In the past, the speech path equipments have been treated as separate units from the controllers and the scanners both conceptually and from the standpoint of packaging. The central processing unit has also been separate from the controllers and the scanners and the information has been exchanged therebetween in parallel form.

The prior art speech path apparatus described above had the following drawbacks. Firstly, the wiring for the switch drive lines extending between the switching networks and the switch controllers is of large volume because of parallel wiring, the length of the wiring is relatively long, and a high level of noise is induced from a high level of signal on the speech path line. In order to allow the transmission of a pulse of logical signal level of the order of several microseconds over such a transmission line, an expensive line such as a paired wire, a shielded wire or a coaxial cable should be used depending on the length of the line in order to overcome the noise problem. Furthermore, in a large scale apparatus, a plurality of switch controllers should be provided because of the restriction imposed on the length of the line. The same is true for the trunk controllers, the line scanners and the trunk scanners.

Secondly, since the drive lines between the central processing unit and the line scanners, switch controllers, the trunk controllers and the trunk scanners extend over rack to rack, a special transmission system such as a balanced cable driver is required. As a result, a driver is required for each unit. The total number of the drivers increases because of the parallel transmission. This, in turn, occupies more space and increases the cost.

Thirdly, the large volume of wiring blocks the rationalization of the manufacture by reducing the volume of wiring by the introduction of the semiconductor speech path switches and the printed circuit parts to miniaturize the switching networks and the trunks.

It is an object of the present invention to eliminate the above drawbacks encountered in the prior art and to provide a speech path apparatus which reduces the number of steps of wiring, enhances the resistance to noise and enhances the cost reduction.

In order to achieve the above object, the present invention provides a controller for each packaging unit of the switches and the trunks and transmits a control signal over a serial bus between the controller and a central processing unit to reduce the wiring.

According to one aspect of the present invention, a speech path apparatus is provided wherein a plurality of speech path equipments each having controlled points are divided into an appropriate number of packaging units, and a controller is provided for each packaging unit. The controller comprises a shift register for receiving a control signal sent from the central processing unit in serial form, a means for determining whether the received control signal is for its own unit, and a means for translating the control signal stored in the shift register to send it out in parallel form to the control point.

According to another aspect of the present invention, a speech path apparatus is provided wherein a scanner for detecting a status of a particular circuit in the speech path equipment, e.g. a line circuit and a trunk circuit, is also provided for each of the packaging units. The controller also includes a means for driving the scanner.

According to a further aspect of the present invention, a speech path apparatus is provided wherein the controller further includes a means for checking the validity of the received control signal and the validity of the operation of its own and sending the check results back to the central processing unit.

The above and other objects, features and advantages of the present invention will be apparent from the following detailed description of the preferred embodiments of the invention when taken in conjunction with the accompanying drawings.

FIG. 5 is a circuit diagram of a network controller shown in FIG. 1.

FIG. 6 is a time chart illustrating an example of a control signal between a control processing unit and the controller.

Figure 1:
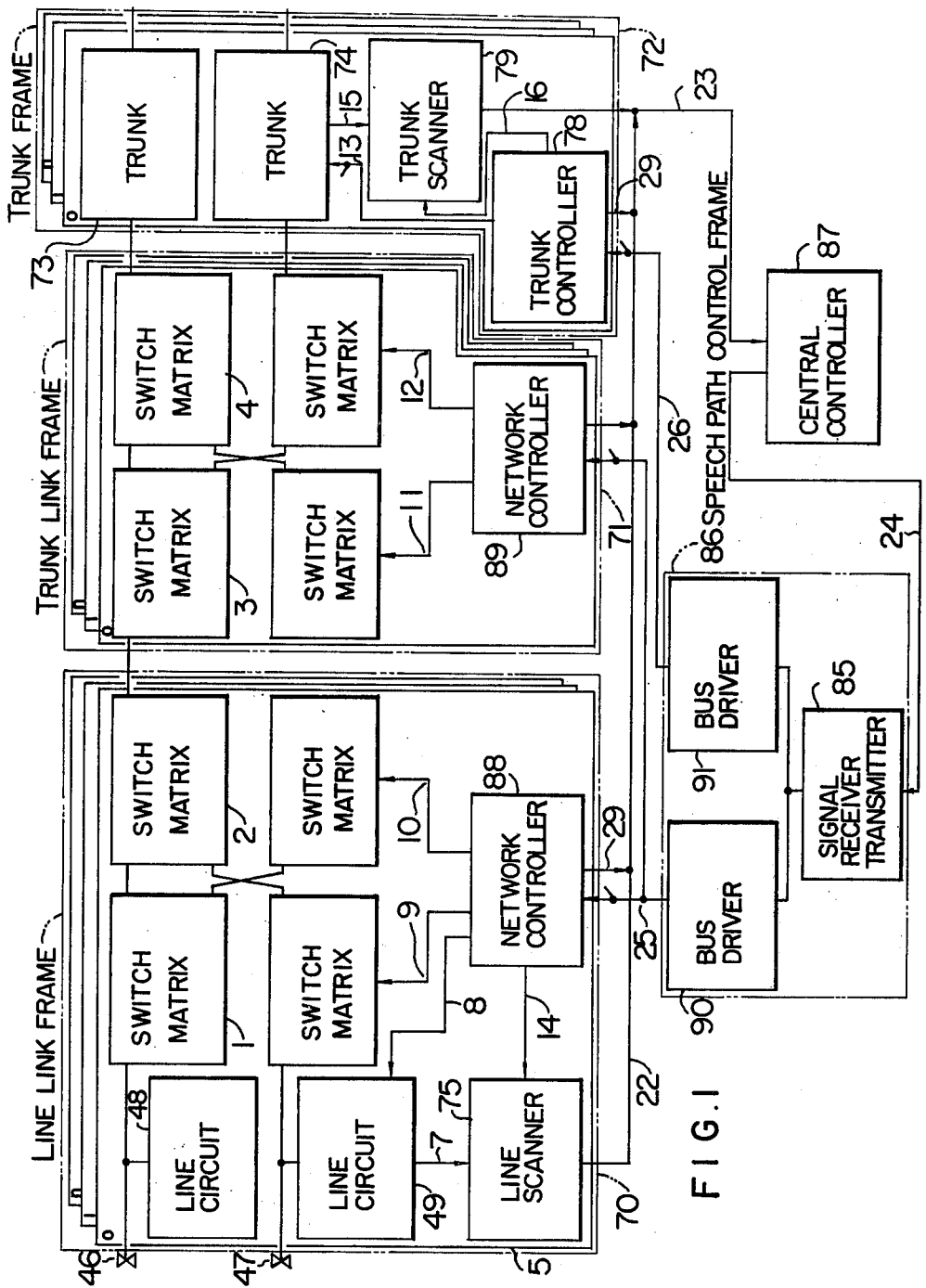
FIG. 1 is a block diagram illustrating one embodiment of a speech path apparatus of the present invention.

Referring to FIG. 1, numerals 46 and 47 denote telephone sets, 48 and 49 denote line circuits, 1 to 4 denote switch matrices comprising semiconductor crosspoint switches, which are assembled to form a network. The network comprises packaging units of grid boards 5 and 6 which are component units for a line link rack 70 and a trunk link rack 71. Numerals 73 and 74 denote trunk circuits which are packaged in a trunk rack 72. Numeral 75 denotes a line scanner for sensing a status of the line circuits, 76 and 77 denote switch controllers for controlling the switch matrices 1 to 4, numeral 78 denotes a trunk controller for controlling the trunk circuits 73 and 74, and numeral 79 denotes a trunk scanner for sensing a status of the trunk circuits.

Numeral 7 denotes a line scanner sense line, 8 denotes a line circuit drive line, 9 to 12 denote switch drive lines, 13 a trunk drive line, 15 a trunk scanner sense line, 22 and 23 answer buses, and 24 an address bus. Numeral 86 denotes a speech path control frame. Numeral 87 denotes a central control unit which has a function of exchanging speech path control information through the address bus 24 and the answer buses 22 and 23. Numerals 88 and 89 denotes network controllers, 78 a trunk controller, and 90 and 91 bus drivers. These are major elements of the present invention. Numeral 14 denotes a line scanner drive line, and 16 a trunk scanner drive line. Numerals 25 and 26 denote control buses for connecting a signal distribution circuit 85 with the network controllers 88 and 89 and the trunk controller 78. The lines between the network controllers 88 and 89 and the trunk controller 78 are of two-line type comprising two paired-lines. Numerals 27 to 29 denote ASW answer buses for sending ASW signals indicating the validity of the operations of the network controllers 88 and 89 and the trunk controller 78, back to the central processing unit.

Figure 2:
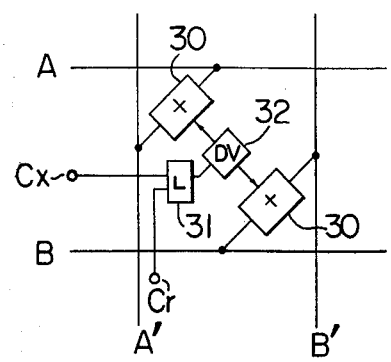
FIG. 2 is a circuit diagram of a crosspoint of a semiconductor speech path switch constituting a switching network shown in FIG. 1.

FIG. 2 shows a circuit diagram of a crosspoint in a space-division type speech path switch, in which A and B denote incoming lines, A' and B' denote outgoing lines, numeral 30 denotes a crosspoint device such as thyristor or field effect transistor, $C_X$ and $C_Y$ denote crosspoint control terminals, 31 denotes an input logic circuit and 32 denotes a crosspoint drive circuit with holding function. The operation of the crosspoint is controlled by applying fast pulses of logic level to the control terminals $C_X$ and $C_Y$. The input logic circuit 31 operates in response to the signals at $C_X$ and $C_Y$ and the holding circuit in the crosspoint drive circuit 32 is set to drive the crosspoint devices 30. When driven, the crosspoint devices render the path between the in line A and the out line A' and the path between the in line B and the out line B' conductive. In resetting, a pulse is applied to one of the control terminals $C_X$ and $C_Y$ so that the input logic circuit 31 is operated and the holding circuit in the crosspoint drive circuit 32 is reset to restore the crosspoint devices 30 from conductive state to non-conductive state.

By arranging the crosspoint switches shown in FIG. 2 in $m \times n$ matrix array, an $m \times n$ space-division type speech path switch matrix is contructed.

Figure 3:
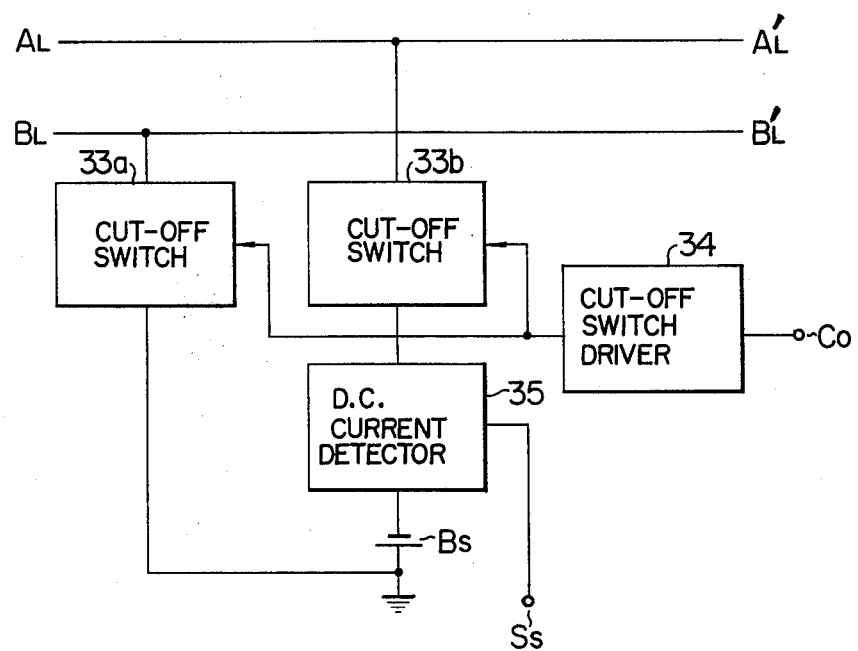
FIG. 3 shows a circuit diagrams of a line circuit shown in FIG. 1.

FIG. 3 shows an example of a line circuit for detecting a calling state, in which 33a and 33b denote cutoff switches, 34 denotes a cutoff drive circuit with holding function for controlling the cutoff switches 33a and 33b, 35 denotes a current detection circuit for detecting a D.C. current, $B_s$ denotes a battery, $A_L$ and $B_L$ denote in lines, $A'_L$ and $B'_L$ denote out lines. A subscriber line is connected to the in lines $A_L$ and $B_L$ while a network is connected to the out lines $A'_L$ and $B'_L$. Co denotes a cutoff control terminal for controlling the cutoff drive circuit 34, and $S_s$ denotes a detection terminal for indicating the detection result by the current detection circuit 35.

The operation of the line circuit of the construction shown in FIG. 3 is controlled in the following manner. The cutoff switches 33a and 33b are normally conductive. When a telephone set (not shown) connected between the in lines $A_L$ and $B_L$ goes off hook, a D.C. loop current flows in a closed loop of ground-cutoff switch 33a — in line $B_L$ — telephone set (not shown) — in line $A_L$ — cutoff switch 33b — current detection circuit 35 — battery $B_S$, and this is indicated at the detection terminals $S_S$ of the current detection circuit 35 by a logic level signal. By cyclically sensing the detection terminal $S_s$, the calling state can be detected. After the detection, a fast pulse of logic level is applied to the cutoff control terminal Co to reset the holding circuit in the cutoff drive circuit 34 to render the cutoff switches 33a and 33b non-conductive. In the reset operation after the termination of speech, a pulse is again applied to the cutoff control terminal Co to render the cutoff drive circuit 34 cutoff to reset the cutoff switches 33a and 33b to conductive state.

Figure 4:
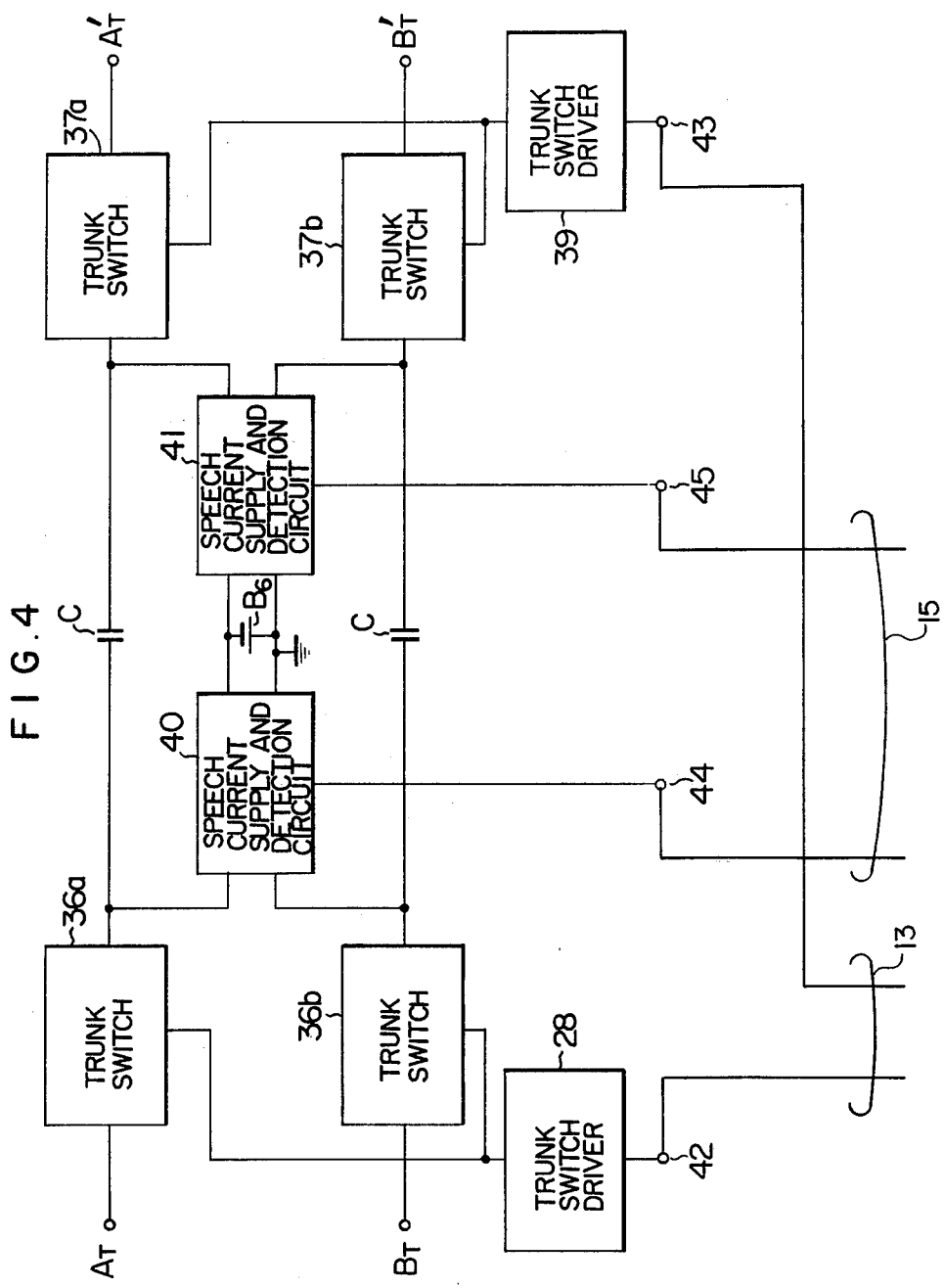
FIG. 4 is a circuit diagram of a trunk circuit shown in FIG. 1.

FIG. 4 shows an example of a trunk circuit for a local office, in which numerals 36a, 36b, 37a and 37b denote trunk switches for controlling the speech currents, 38 and 39 denote trunk switch drive circuits with holding function, 40 and 41 speech current supply and detection circuits having high A.C. impedance and low D.C. resistance and with D.C. current detection function, C denotes a D.C. blocking capacitor, $B_t$ denotes a battery, $A_T$ and $B_T$ denote in lines, $A'_T$ and $B'_T$ denote out lines, 42 and 43 denote trunk switch control terminals, and 44 and 45 denote detection terminals for indicating current detection results by the speech current supply and detection circuits 40 and 41, respectively.

In the operation of the trunk circuit shown in FIG. 4, control pulses of logic level are applied to the trunk switch control terminals 42 and 43. The holding circuits in the trunk switch drive circuits 38 and 39 are set by the control pulses so that the trunk switches 36a, 36b, 37a and 37b are actuated to supply the speech current to a telephone set, not shown, through the speech current supply and detection circuits 40 and 41. During the speech, the detection terminals 44 and 45 are cyclically sensed to monitor the end of the speech. When the end of the speech is detected, control pulses are applied to the trunk switch control terminals 42 and 43 to reset the trunk switch control circuit to the initial state.

FIG. 5 shows a circuit diagram illustrating an example of construction of the network controllers 88 and 89 shown in FIG. 1. In FIG. 5, numerals 50 and 51 denote input transformers for the "0" signal control bus and the "1" signal control bus, respectivley. They can receive signals from either one of the duplexed "0" and "1" systems. FIG. 5 shows only one system for the purpose of simplification. Numerals 52 and 53 denote input circuits for converting signals received by the input transformers to logic level signals, 54 denotes an OR circuit, 55 denotes a timing circuit for generating clock pulses from the "0" signal and the "1" signal, 56 denotes a shift register which shifts at the output clock of the timing circuit 55. Numeral 57 denotes a parity check circuit comprising a one-bit counter which counts up "1" signals to determine the parity. Numeral 58 denotes a start flip-flop which detects an overflow of the synchronous pulse (SYN) which is shifted through the shift register 56. Numeral 59 denotes a coincidence circuit which detects the coincidence of a device number (DVN) unique to the respective network controller and the received device number (DVN), numeral 60 denotes a timing circuit for generating a control timing signal, 61 denotes an AND circuit, 62 and 63 denote output circuits, and 64 and 65 denote output transformers which send ASW signals to the ASW answer bus 28. Numerals 66 to 68 decoders which develop the received signals and transfer the signals to the switch matrices 1 to 4 or the line scanner 75.

FIG. 6 is a time chart for illustrating distribution timing of the control pulses of the network controllers. The signals of the control bus and the ASW bus are sent in the direction of arrows shown in FIG. 6. Synchronizing pulse (SYN), device number (DVN), order (ORD), control information (DATA) and parity bit (PRT) are received in this order and ASW signal (ASW) is sent back after the check of reception.

Those portions of FIG. 1 which are pertinent to the present invention are now explained.

Control signals for the networks, trunks and scanners which are sent from the central controller 87 to the signal distribution unit 85 are translated and analyzed in the signal distribution unit 85 to convert them in serial form as shown in FIG. 6, and they are then simultaneously sent to the control buses 25 and 26 by the bus drivers 90 and 91. On the other hand, the network controllers 88 and 89 and the trunk controller 78 all receive the above signals and store the information in the shift register 56 while they check by the coincidence circuit 59 whether the signal coincides with the device number assigned to its own unit. The controller in which the coincidence has not occurred does not actuate the timing circuit 60 and the shift register 56 and other flip-flops in that controller are automatically cleared by a circuit, not shown, after the lapse of a predetermined time period. On the other hand, the controller in which the coincidence of the device number has occurred, the comparison with the output of the parity check circuit 57 for the received information is carried out, and if the normal is indicated, the timing circuit 60 is activated. At the same time, the valid signal ASW is sent back to the central controller 88 through the ASW answer bus. Then, depending on the result of the translation of the order ORD, the outputs of the decoders 66 and 67 for the control information DATA are distributed to the switch matrices 1 to 4 through the switch drive lines 9 to 12, or to the line scanner 75 through the line scanner drive line 14 to actuate the controlled points. In case of line scan, the result of sensing is sent back to the control controller 87 through the answer buses 22 and 23.

The trunk controller 78 operates in the exactly same manner as the network controllers 88 and 89.

While the networks 88 and 89, the trunk controller 78, the line scanner 75 and the trunk scanner are arranged in correspondence with the grid board 5 in the above embodiment, it should be understood that the present invention need not be limited to the illustrated example but any control and packaging unit may be selected such that the drive lines and the controllers are economized as a whole.

Furthermore, the number of sections of the control buses 25 and 26 between the signal distribution unit 85, the network controllers 88 and 89 and the trunk controller 78 may be any number depending on the number of controllers and the drive capacity of the bus drivers. In a small scale system, a single section would be sufficient. While the "0" signal and "1" signal are transmitted over separate control buses in the above embodiment, a bipolar pulse may be employed, in which case a single bus is required. Furthermore, the control buses 25 and 26, the answer buses 22 and 23 and the ASW answer buses 27 to 29 are not limited to the A.C. bus system using the transformer but they may be D.C. buses or the buses using photo-couplers.

As described hereinabove, the present invention affords the following advantages. Firstly, the length of the drive lines between the network controllers and the trunk controllers and the driven points as well as the length of the sense lines between the scanners and the scanned points can be reduced, and those lines can be implemented by printed circuit wiring. Accordingly, the expensive lines such as shielded wires are not required and the number of steps of wiring is substantially reduced, and the size of the apparatus can also be reduced.

Secondly, by the virtue of the serial transmission, the balanced bus cables for the control signals between the signal distribution device and the network controllers and the trunk controllers may be only one to several cables, and the expensive bus drivers, receivers and cables can be saved.

Thirdly, by the virtue of the integration of the network controllers, the trunk controllers and the control section for the line scanner and the trunk scanner, the common part can be constructed economically.

Fourthly, by the virtue of the reduction in the length of wiring between the controllers and scanners, and the driven points and the scanned points as well as the use of printed circuit wiring, the resistance to the noise is enhanced and a high stable control system can be provided.

Fifthly, the control system of the present invention can be constructed by elements of logic level signal except one to several control buses and ten to several tens answer buses. Therefore, it may be readily fabricated in a low-cost large scale integrated circuit structure so that the miniaturization and cost reduction are further enhanced. In this case, depending on the scale of the system, the network controller may be built in the switch matrix.

As described hereinabove, the present invention can provide a speech path control apparatus which is of small size, stable in operation and requires a fewer number of steps for wiring and hence is economic.

What is claimed is:

1. A speeth path apparatus for space-division type electronic exchange equipment comprising:
    a plurality of speech path equipment each having controlled points, said speech path equipments being divided into packaging units;
    controllers, each provided at a respective one of said packaging units, each one of said controllers including
        shift register means for receiving control information sent from a central processing unit in serial form and storing said control information,
        means, connected to said shift register means, for determining whether the received control information is for its own unit, and
        decoder means, connected to said shift register means and controlled by the output of said determining means, for translating said control information and converting it to a parallel signal; and
    signal lines connecting said controlled points with the output of said decoder means.

2. A speech path apparatus according to claim 1, wherein certain of said packaging units each includes a scanner for sensing a status of the speech path equipment in its own unit, said scanner having its controlled points connected to the output of said decoder means.

3. A speech path apparatus according to claim 1, wherein each of said controllers further includes a means for checking the validity of the received control information and the validity of its own operation and sending the results of checking back to said central processing unit.

* * * * *